P. L. JOHNSON & F. J. S. KILGOUR.
TRANSMISSION GEARING.
APPLICATION FILED OCT. 5, 1912.

1,072,237.

Patented Sept. 2, 1913.
4 SHEETS—SHEET 2.

WITNESSES

INVENTORS
Percy L. Johnson
Francis J. S. Kilgour

UNITED STATES PATENT OFFICE.

PERCY LAW JOHNSON AND FRANCIS JOHN STEWART KILGOUR, OF HEREFORD, ENGLAND.

TRANSMISSION-GEARING.

1,072,237. Specification of Letters Patent. Patented Sept. 2, 1913.

Application filed October 5, 1912. Serial No. 724,186.

*To all whom it may concern:*

Be it known that we, PERCY LAW JOHNSON and FRANCIS JOHN STEWART KILGOUR, both British subjects, both residing at Hereford, in the county of Hereford, England, have invented certain new and useful Improvements in Transmission-Gearing, of which the following is a specification.

This invention relates to transmission gearing in which the driving motion is transmitted from an eccentric or eccentrics on the driving shaft to a series of one way clutches on the driven shaft, the throw of the eccentric or eccentrics being adjustable from zero up to the maximum to vary or change the speed of the driven shaft. Such transmission gearing has been constructed with two parallel shafts, one outside the other, and the eccentric straps of the eccentric on one shaft connected to the clutches on the other shaft by connecting rods.

This invention is designed to construct transmission gearing of this type with the clutches and driven shaft placed within the eccentric, and the driving part of the mechanism concentric with the driven shaft.

The invention consists essentially in a driving eccentric or eccentrics consisting of primary and secondary parts capable of adjustment relatively one to the other, an internal strap oscillated by the rotation of the eccentric, and a series of one-way clutches to which the eccentric strap is connected placed within the eccentric on and concentric with a driven shaft passed through the interior thereof. It will be fully described with reference to the accompanying drawings forming part of the specification.

Figure 1:
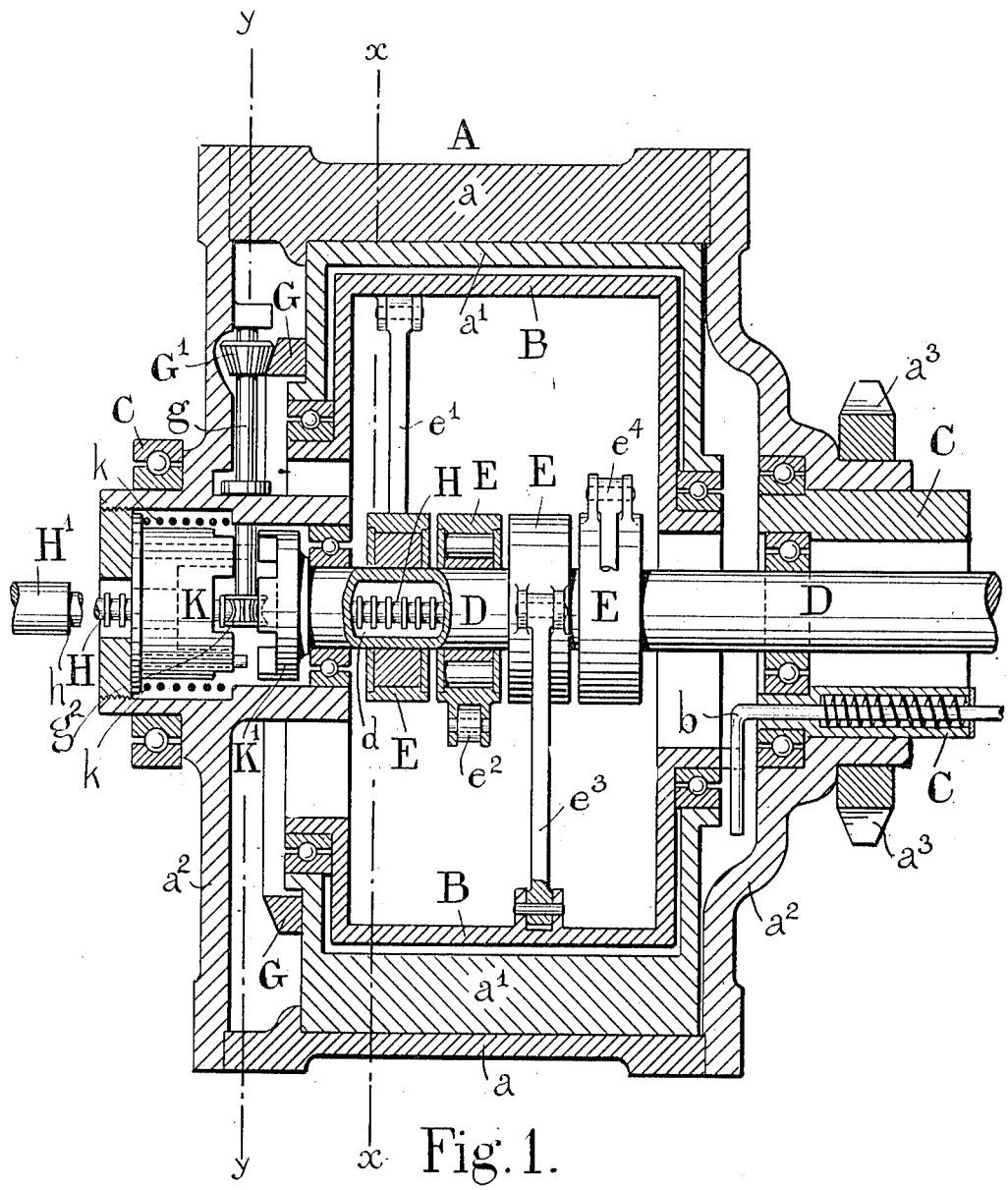
Figure 2:
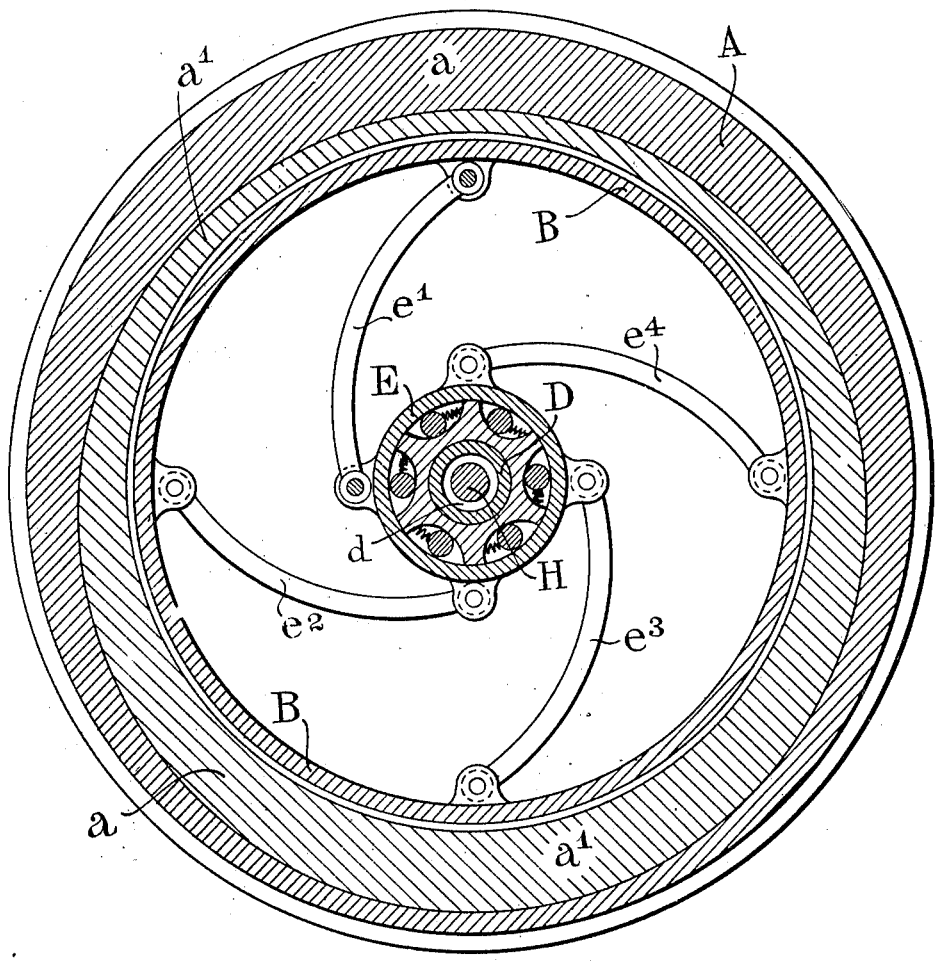
Figure 3:
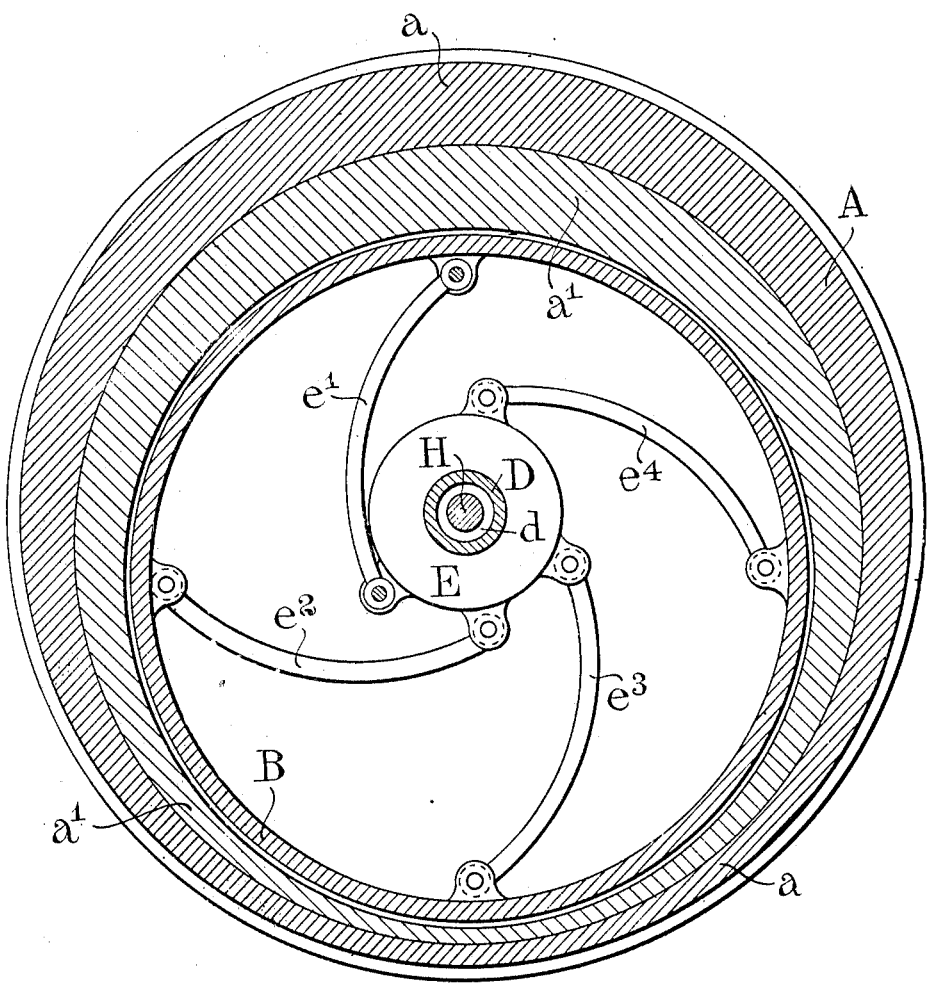
Figure 4:
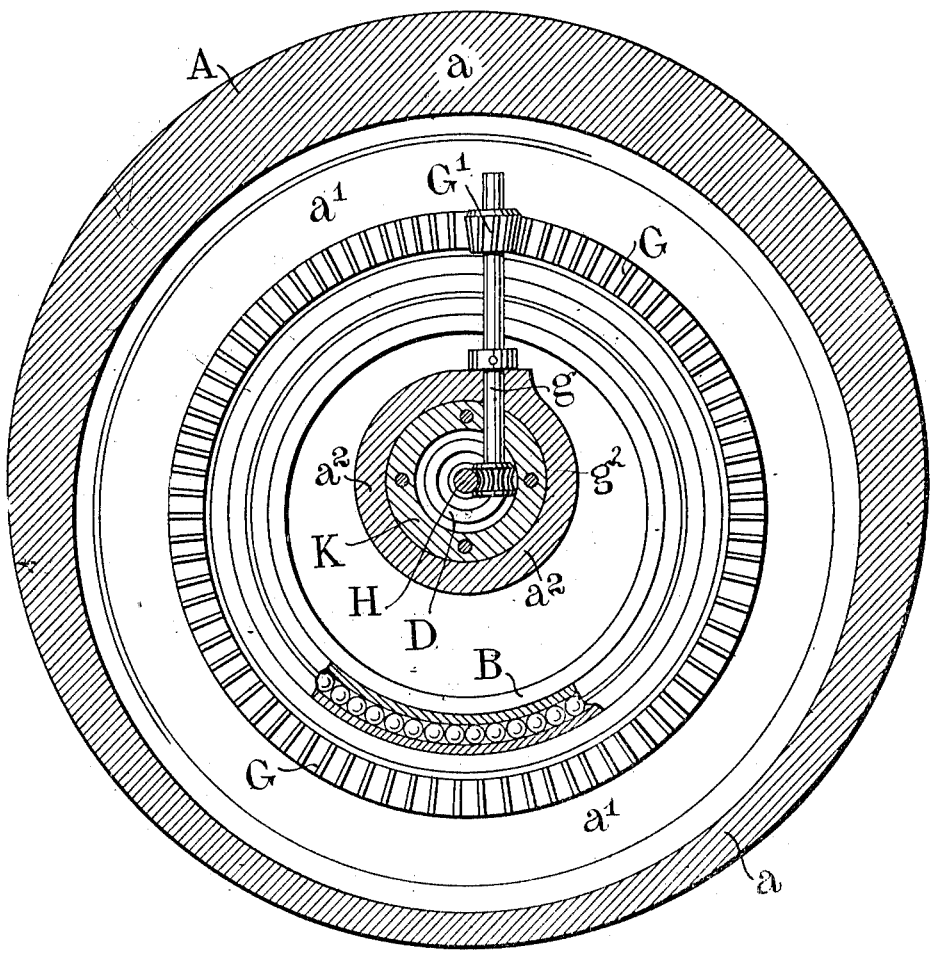

Figure 1 is a longitudinal section showing the position of the parts when the throw of the eccentric is at zero. Fig. 2 is a transverse section of the same on line $x-x$. Fig. 3 is a similar transverse section showing the position of the parts when the throw of the eccentric is at the maximum. Fig. 4 is a transverse section on line $y-y$ Fig. 1.

The apparatus is constructed with a driving eccentric A comprising primary and secondary parts $a$ and $a^1$, the secondary part $a^1$ being placed within the primary part $a$ and being capable of movement or adjustment within to vary the throw. The secondary eccentric $a^1$ is hollow and within it is placed an annular eccentric strap B to which an oscillating movement is imparted by the rotation of the eccentric. The eccentric A is preferably cylindrical on the periphery and is formed with ends $a^2$ which are mounted on suitable fixed bearings C. To one end a chain wheel $a^3$ or other driving wheel or pulley is affixed. The eccentric strap B is annular and through it the shaft D to be driven is passed, and upon this shaft, concentric therewith and within the eccentric, a number or series of one-way clutches E are keyed or otherwise affixed. The eccentric strap B is connected to each of the clutches E by connecting rods $e^1$, $e^2$, $e^3$, $e^4$, which are set in rotation and arranged at equal distances apart around the interior of the strap B, so that as the eccentric strap B is oscillated by the movement of the eccentric the clutches are progressively moved forward (and drawn back) upon the shaft D, thus imparting a rotary movement to the latter, the movement of one clutch commencing before the preceding one ceases to rotate the shaft. The return or backward movement of the clutch has no effect upon the shaft as the clutch acts in one direction only. Four one-way clutches E are shown; but a greater number may be employed, as the greater the number the more even and perfect will be the movement imparted to the shaft D, as several of the clutches will be operating at the same time. A pin or clutch $b$ may be fitted to the eccentric strap B to prevent it creeping around with the motion of the eccentric.

The eccentric A, the strap B and the shaft D are mounted on any suitable or convenient bearings to permit of their independent rotation.

The secondary or adjusting part $a^1$ of the eccentric A is fitted at one end with a bevel gear G with which meshes a small bevel gear $G^1$ on a shaft or spindle $g$. By rotating this spindle $g$, the relative position of the parts $a$ and $a^1$ can be altered, thereby either reducing or increasing the throw of the eccentric. The spindle $g$ and gear $G^1$ are rotated by a sliding rack H engaging a pinion $g^2$ on the end of the spindle $g$. The rack H is preferably circular, is carried at the end of a sliding rod $H^1$ and enters a recess $d$ bored in the end of the driven shaft D. The rod $H^1$ may be operated by a lever, screw or other device (not shown).

One member K of a clutch is mounted to rotate with the eccentric A, and the other member $K^1$ of the clutch is affixed to the end of the driven shaft D. When therefore, the rack H is pressed inward until the relative positions of the primary and secondary parts of the eccentric are such as to bring the strap B into the position of maximum eccentricity as in Fig. 3, the member K of the clutch is forced inward by the shoulder or collar $h$ of the rod H to engage the clutch member $K^1$, and the driven shaft is then coupled to the primary part of the eccentric, thereby locking and causing the mechanism to rotate together. A spring $k$ withdraws the clutch member K when the rack is drawn out to decrease the throw of the eccentric.

The rotary movement of the eccentric A is transmitted from the eccentric strap B through the connecting rods $e^1$, $e^2$, $e^3$, $e^4$, successively to the clutches E and shaft D, and the speed of the clutches and shaft are varied according to the throw of the eccentric.

What we claim as our invention and desire to protect by Letters Patent is:—

1. In an apparatus for transmitting motion, the combination, with a hollow eccentric formed in two parts to render the throw adjustable, and an annular eccentric strap arranged internally of said eccentric, of a series of one-way clutches, rods connecting said clutches to said strap, and a shaft to which said clutches are concentrically affixed.

2. In an apparatus for transmitting motion, the combination, with a hollow eccentric comprising main and secondary parts, an annular eccentric strap arranged internally of said eccentric, and one-way clutches concentric therewith, of a bevel gear affixed to the secondary part, a spindle, a gear carried by said spindle in mesh with the first-named gear, and a sliding rack for rotating said spindle to alter the relative positions of said main and secondary parts.

3. In an apparatus for transmitting motion, the combination with a hollow two-part eccentric, an internal eccentric strap, a driven shaft, and a series of one-way clutches affixed concentrically to said shaft and connected with said strap, of means for adjusting the parts of said eccentric relatively to each other to vary the throw, and means for locking said parts to said shaft when the eccentric is at its maximum throw.

4. In an apparatus for transmitting motion, the combination, with a hollow two-part eccentric, an internal eccentric strap, a driven shaft, and a series of one-way clutches affixed concentrically to said shaft and connected with said strap; of means for adjusting the parts of said eccentric relatively to each other to vary the throw, and coöperating clutch members carried by said eccentric and said shaft which are thrown into engagement when the eccentric is at its maximum throw.

In testimony whereof we have hereunto set our hands in presence of two subscribing witnesses.

PERCY LAW JOHNSON.
FRANCIS JOHN STEWART KILGOUR.

Witnesses:
J. OWDEN O'BRIEN,
GEO. H. O'BRIEN.